US009248715B2

(12) United States Patent
Bussit et al.

(10) Patent No.: US 9,248,715 B2
(45) Date of Patent: Feb. 2, 2016

(54) SUSPENSION THRUST BEARING DEVICE AND STRUT EQUIPED WITH SUCH A DEVICE

(71) Applicants: Sylvain Bussit, Monnaie (FR); Christophe Houdayer, Semblancay (FR); Bruno Montboeuf, Cerelles (FR); Adrien Nerriere, Amiens (FR); Jean-Marc Soudee, Tours (FR); Desire Vidot, Ballan-Miré (FR)

(72) Inventors: Sylvain Bussit, Monnaie (FR); Christophe Houdayer, Semblancay (FR); Bruno Montboeuf, Cerelles (FR); Adrien Nerriere, Amiens (FR); Jean-Marc Soudee, Tours (FR); Desire Vidot, Ballan-Miré (FR)

(73) Assignee: AKTIEBOLAGET SKF, Gothenburg (SE)

( * ) Notice: Subject to any disclaimer, the term of this patent is extended or adjusted under 35 U.S.C. 154(b) by 125 days.

(21) Appl. No.: 13/868,279

(22) Filed: Apr. 23, 2013

(65) Prior Publication Data

US 2013/0277161 A1    Oct. 24, 2013

(30) Foreign Application Priority Data

Apr. 23, 2012 (FR) ...................................... 12 53695

(51) Int. Cl.
*B60G 13/00* (2006.01)
*F16C 33/76* (2006.01)
*B60G 15/06* (2006.01)
*F16C 33/80* (2006.01)
*F16C 19/10* (2006.01)
*F16C 33/78* (2006.01)

(52) U.S. Cl.
CPC ............ *B60G 13/003* (2013.01); *B60G 15/068* (2013.01); *F16C 33/76* (2013.01); *F16C 33/761* (2013.01); *B60G 2204/128* (2013.01); *B60G 2204/418* (2013.01); *F16C 19/10* (2013.01); *F16C 33/7889* (2013.01); *F16C 33/80* (2013.01)

(58) Field of Classification Search
CPC .... B60G 13/003; B60G 15/068; F16C 33/76; F16C 33/761
USPC ............ 384/607, 482, 485, 15; 277/361, 402, 277/562; 267/217, 220; 188/321.11
See application file for complete search history.

(56) References Cited

U.S. PATENT DOCUMENTS

| 5,618,116 | A  | * | 4/1997 | Ishikawa ........................ 384/607 |
| 2002/0009250 | A1 | | 1/2002 | Schwarzbich |
| 2011/0089642 | A1 | * | 4/2011 | Terasawa ....................... 277/562 |
| 2011/0133379 | A1 | * | 6/2011 | Viault et al. ................... 267/217 |

FOREIGN PATENT DOCUMENTS

| DE | 202010008769 U1 | 1/2012 |
| FR | 2934656 A1 | 2/2010 |
| FR | 2948739 A1 | 2/2011 |

(Continued)

*Primary Examiner* — Melanie Torres Williams
(74) *Attorney, Agent, or Firm* — Bryan Peckjian; SKF USA Inc. Patent Dept.

(57) ABSTRACT

The present invention relates to a suspension bearing device, comprising a rolling bearing forming an axial stop along a main axis and at least one seal adapted for protecting the rolling bearing from ingress of water or of polluting particles. The device is characterized in that it also comprises a bottom cup and a top cup made of plastic, in contact with the rolling bearing, the bottom cup forming a bearing means for a suspension spring, and in that the or each seal is made of thermoplastic overmolded onto a first element between the cups and comprises a base of substantially annular shape from which extends at least one sealing lip in contact with the second element between the cups. The invention also relates to a strut of a motor vehicle, comprising a damper and a suspension bearing device as mentioned above.

20 Claims, 3 Drawing Sheets

(56) References Cited

FOREIGN PATENT DOCUMENTS

| FR | 2965028 | A1 |   | 3/2012 |
|----|---------|----|---|--------|
| FR | 2965028 | A1 | * | 3/2012 |
| JP | 1997303474 | A |   | 11/1997 |
| JP | 2009002425 | A | * | 1/2009 |
| WO | WO 2010012766 | A1 | * | 2/2010 |

* cited by examiner

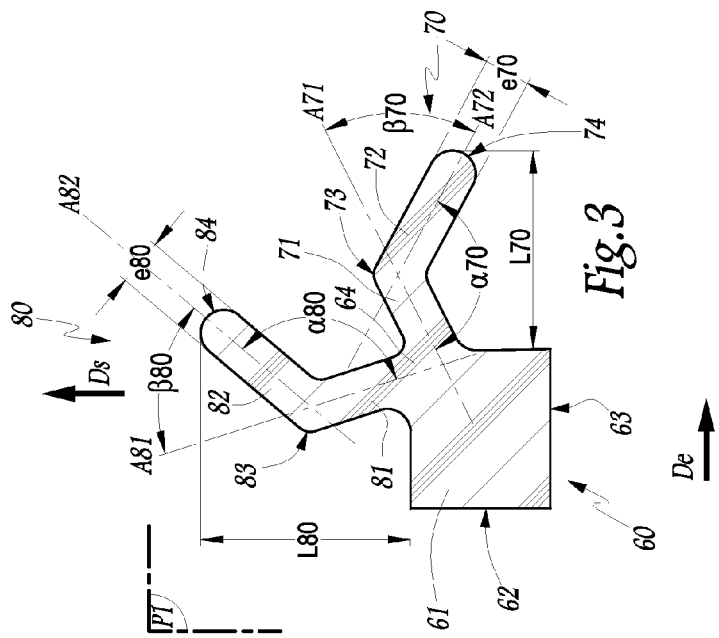
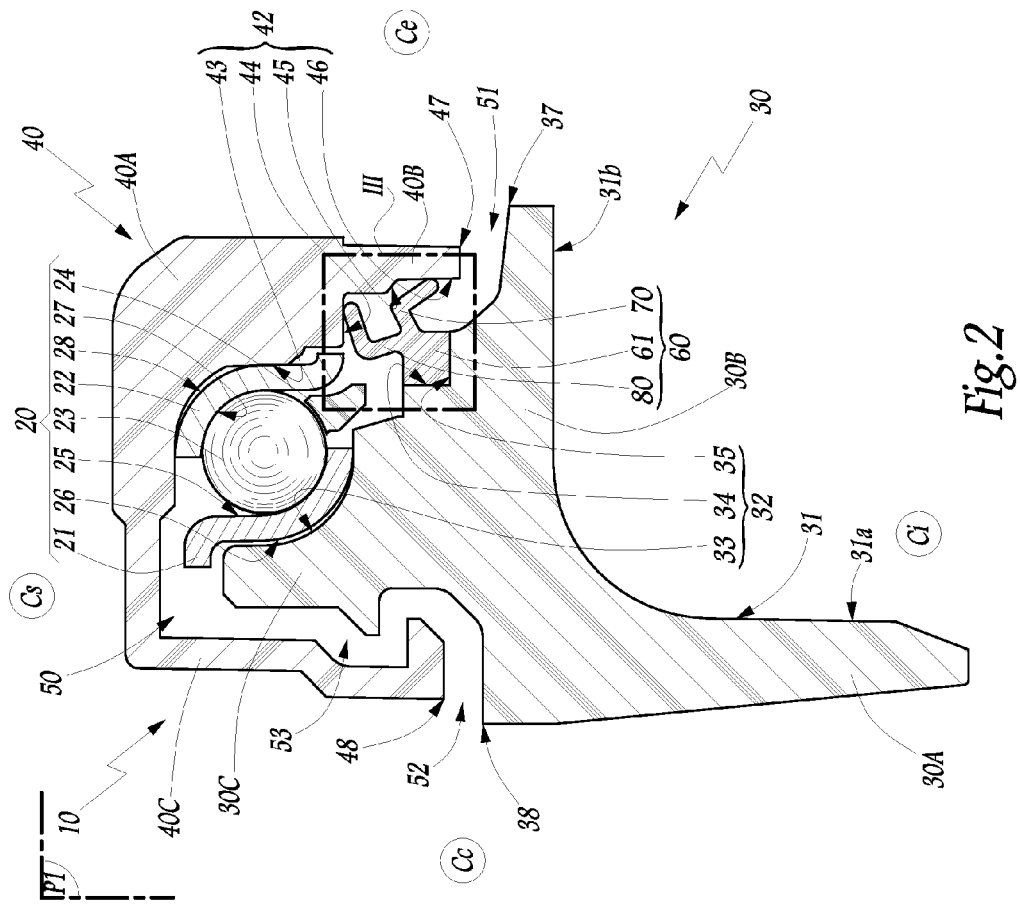

SUSPENSION THRUST BEARING DEVICE AND STRUT EQUIPED WITH SUCH A DEVICE

CROSS-REFERENCE TO RELATED APPLICATIONS

This application claims priority to French patent application no. 1253695, filed on Apr. 23, 2012, the contents of which are fully herein incorporated by reference.

FILED OF THE INVENTION

The present invention relates to a suspension bearing device, in particular of the MacPherson type ("MacPherson Suspension Bearing" or MSBU). The invention also relates to a strut for a motor vehicle, comprising a damper and such a suspension bearing device. The field of the invention is that of suspension systems, notably motor-vehicle suspension systems.

In a known manner, a motor-vehicle suspension system comprises a strut supporting a vehicle axle and a wheel. A suspension bearing is placed in the top portion of the strut opposite to the wheel and the ground, between a suspension spring and a top member secured to the body of the vehicle. The spring is placed around a damper piston rod of which the end may be secured to the vehicle body.

The suspension bearing comprises a bearing, a bottom cup, a top cup and at least one seal placed between the cups. Except for the seal, the various elements forming the suspension bearing are generally made of metal in order to increase their mechanical strength. The top cup is interposed between a top race of the rolling bearing and the top member, while the bottom cup is interposed between a bottom race of the rolling bearing and the suspension spring. Thus, the suspension bearing is adapted to transmit axial forces between the suspension spring and the body of the vehicle while allowing a relative angular movement between the races of the rolling bearing.

Such a suspension bearing, notably of the MSBU type, is required to be used in an aggressive environment. The vehicle is for example likely to run on a flooded, dusty or muddy road and then be cleaned with a high-pressure water jet. In these conditions, ingress of water or of other polluting particles may occur in the stop, notably in the bearing, with harmful consequences to their service lives and their respective performances. The seal or the seals incorporated into the stop are designed to prevent this ingress into the suspension bearing.

Documents U.S. Pat. No. 5,618,116, JP-A-1997 303 474 and JP-A-2009 002 425 describe various suspension bearings fitted with a seal. In each of these stops, the rubber seals are overmoulded onto a metal support, while their sealing lips rest on metal surfaces. Because of the sliding contact between the rubber seal and the metal surfaces, the sealing and therefore the reliability of such stops are not entirely satisfactory.

SUMMARY OF THE INVENTION

The object of the present invention is to propose an enhanced suspension bearing device.

Accordingly, the subject of the invention is a suspension bearing device comprising at least one rolling bearing forming an axial stop along a main axis and at least one seal adapted for protecting the rolling bearing from ingress of water or of polluting particles. The suspension bearing device is characterized in that it also comprises a bottom cup and a top cup made of plastic, in contact with each rolling bearing, the bottom cup forming a bearing means for a suspension spring, and in that the or each seal is made of thermoplastic overmoulded onto a first element made of plastic between the bottom cup and the top cup and comprises a base of substantially annular shape from which extends at least one sealing lip in contact with the second element made of plastic between the bottom cup and the top cup.

Thus, the invention makes it possible to enhance the sealing of the suspension bearing device and therefore its reliability and its strength in service. The overmoulding of the seal or seals onto plastic surfaces reinforces their relative mechanical adhesion. Since the sealing lip or lips are each in contact with a plastic surface, the risk of these lips sliding towards an unsealed configuration is reduced. The use of elements made of plastic also makes it possible to reduce the cost of the device in comparison with elements made of metal. Moreover, the bulk of the device is reduced because of the absence of intermediate elements between the bearing and, on the one hand, the bottom cup forming a seat for the suspension spring and, on the other hand, the top cup interacting with the top member secured to the vehicle body. Moreover, the annular shape of the base of the seal is simple in comparison with the existing devices, comprising L-shaped or U-shaped bases. Certain variants of the invention further enhance the sealing of the device, notably according to the geometric parameters of the seal as explained in detail below.

According to other advantageous features of the invention, taken in isolation or in combination:

- Each rolling bearing comprises an inner race in contact with the bottom cup made of plastic, an outer race in contact with the top cup made of plastic and rolling elements placed between the inner race and the outer race.
- The suspension bearing device comprises a single angular-contact rolling bearing.
- The seal comprises two sealing lips in contact with the second element, each sealing lip having at least one point of contact with this second element.
- The or each sealing lip comprises a preformed elbow between a first lip portion extending to the base of the seal and a second lip portion extending to a bearing end of the sealing lip on the second element.
- The preformed elbow of the or each sealing lip is set back towards the bearing.
- For the or each sealing lip, in section in a half-plane comprising the main axis the first lip portion extends along a first median line, the second lip portion extends along a second median line, and the sealing lip defines an acute angle, between the first median line and the second median line.
- The two sealing lips of the seal comprise a radial lip of which the acute angle is oriented overall in a direction radial to the main axis, and an axial lip of which the acute angle is oriented overall in a direction axial to the main axis.
- The or each acute angle is between 10° included and 90° excluded.
- The or each sealing lip defines, in section in a half-plane comprising the main axis: a thickness, measured perpendicularly to a median line of the sealing lip, which is substantially constant from the base of the seal to the bearing end of the sealing lip; a length at rest, measured perpendicularly at the base of the seal between this base and the bearing end of the sealing lip when the seal is at rest; and a ratio of the thickness by the length at rest which is strictly less than 0.206, preferably less than 0.2.

The thickness of the sealing lip is constant and between 0.4 and 0.8 millimeter, preferably between 0.5 and 0.7 millimeter, yet more preferably equal to 0.6 millimeter.

The length at rest of the sealing lip is between 2 and 4 millimeters, preferably between 2.5 and 3.5 millimeters, yet more preferably equal to 3 millimeters.

For the or at least certain of the sealing lips, the first lip portion is shorter or of the same length as the second lip portion along their respective median lines, the elbow being closer to or equidistant from the base of the seal than the bearing end of the sealing lip.

The second element between the bottom cup and the top cup has an internal face furnished with a shoulder, and at least one sealing lip of the seal has at least one bearing end with the second element between, on the one hand, the shoulder and, on the other hand, an opening delimited between the bottom cup and the top cup.

The invention also relates to a motor vehicle strut comprising a damper and a suspension bearing as mentioned above.

BRIEF DESCRIPTION OF THE DRAWINGS

The invention will be better understood on reading the following description given only as a non-limiting example and made with reference to the appended drawings in which:

FIG. 2 is a section on a larger scale of the detail II in FIG. 1, showing the suspension bearing device comprising a bearing, a bottom cup, a top cup and a seal;

FIG. 3 is a view on a larger scale of the detail III of FIG. 2, showing the seal only;

Figure 1:
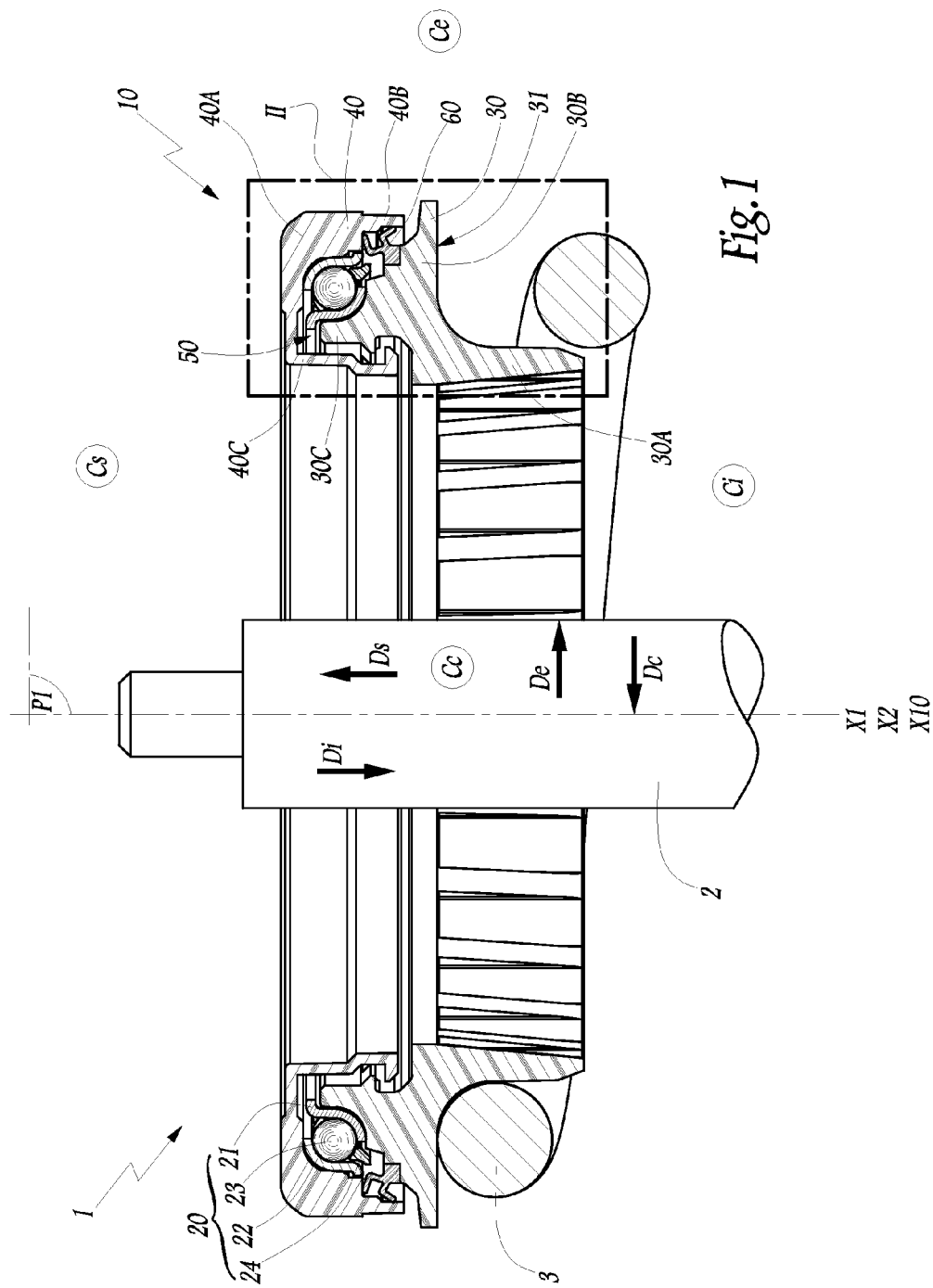
FIG. 1 is a partial axial section of a strut according to the invention, comprising a suspension bearing device also according to the invention, and a damper rod and a suspension spring.

Shown in FIGS. 1 to 3 is a suspension bearing device 10 according to the invention adapted to be fitted to a strut 1 also according to the invention.

DETAILED DESCRIPTION OF THE INVENTION

The strut 1, partially shown in FIG. 1, is incorporated into a motor-vehicle suspension system. The strut 1 supports a vehicle axle and wheel which are not shown for the purposes of simplification. The strut 1 extends along a main axis X1, placed in a substantially vertical direction when the wheel of the vehicle rests on flat ground. The strut 1 comprises a damper piston including a piston body and a damper rod 2, a suspension spring 3 and the suspension bearing device 10. The rod 2 and the spring 3 are partially shown in FIG. 1, while the piston body is not shown, for the purposes of simplification.

Hereinafter, in order to make it easier to identify the device 10 in space, a bottom side Ci is defined on which are situated the ground and the wheel of the vehicle, and a top side Cs opposite to the bottom side Ci, to the ground and to the wheel. Also defined are an inner side Cc corresponding to the main axis X1, and an outer side Ce opposite to the axis X1 relative to the device 10. Also defined is a radial direction and an axial direction relative to the main axis X1. More precisely, a bottom axial direction Di directed towards the bottom side Ci parallel to the axis X1, a top axial direction Ds directed towards the top side Cs parallel to the axis X1, a central radial direction Dc directed towards the inner side Cc radially to the axis X1, and an outer radial direction De directed towards the outer side Ce radially to the axis X1 are defined.

The damper rod 2 extends along an axis X2 and slides in the body, not shown, of the damper piston. When the suspension system of the vehicle is at rest, the axis X2 of the rod 2 is indistinguishable from the main axis X1 of the strut 1, as in FIG. 1. The top portion of the strut 1, as well as the means for connecting the rod to this top portion, are not shown in the figures on the top side Cs for the purposes of simplification.

The suspension spring 3 is placed resting between, on the one hand on the bottom side Ci, the body of the damper piston and, on the other hand on the top side Cs, a bottom cup 30 fitted to the suspension bearing device 10. The spring 3 is wound around the rod 2 and the axis X1. The spring 3 can be deformed elastically according to the stresses applied to the suspension system of the vehicle. The spring 3 applies axial forces, in the top direction Ds, against the cup 30 which transmits these forces to the device 10. In this case, an axial movement of the bottom cup 30 relative to a top cup 40 may occur in the direction Ds, because of the inner clearances of the device 10. In the example of FIG. 1, the spring 3 is advantageously in direct contact with the cup 30, with no intermediate part interposed between them.

The suspension bearing device 10 comprises a single angular-contact rolling bearing 20, the bottom cup 30, the top cup 40 and an outer seal 60. The device 10 and its constituent elements 20, 30, 40 and 60 have overall a shape of revolution, about a central axis X10, when the suspension system of the vehicle is at rest. The cups 30 and 40 delimit between them a housing 50 inside the device 10, in which the rolling bearing 20 and the seal 60 are housed. In the example of FIG. 1, it is considered that the inner diameter of the device 10 about the axis X10 is of the order of 100 millimeters. When the suspension system of the vehicle is at rest, the axis X10 is indistinguishable from the axes X1 and X2 as in FIG. 1.

The rolling bearing 20 includes an inner race 21, an outer race 22, and rolling elements 23 with angular-contact placed between the inner race 21 and the outer race 22, in a cage 24. The inner race 21 is radially closer to the axis X10 than the outer race 22. The inner race 21 is situated on the inner-bottom side Cc+Ci, while the outer race 22 is situated on the outer-top side Ce+Cs. The races 21 and 22 are preferably metallic and formed by stamping. In this case, each of the races 21 and 22 forms a stamped raceway for the rolling elements 23 within the rolling bearing 20. More precisely, the inner race 21 comprises an outer surface 25 forming a raceway for the elements 23 and an inner surface 26 bearing against the bottom cup 30, while the outer race 22 comprises an inner surface 27 forming a raceway for the elements 23 and an outer surface 26 bearing against the top cup 40.

In practice, the rolling bearing 20 forms an axial stop within the device 10, between the cups 30 and 40, in the directions Ds and Di. Thus, the rolling bearing 20 and the device 10 form an axial stop within the strut 1. The rolling bearing 20 allows, on the one hand, a relative pivoting between the races 21 and 22 about the axis X10 and, on the other hand, an inclination of the axis X2 of the rod 2 relative to the body of the vehicle. The rolling bearing 20 is preferably an angular-contact bearing in order to limit the forces and frictions inside the device 10 in service. In the example of FIGS. 1 and 2, the rolling elements 23 are balls, of which the angular-contact with the races 21 and 22 is directed along an axis that is inclined substantially at 45° relative to the axis X10. As an alternative example, the rolling elements 23 may be rollers.

The bottom cup 30 comprises an axial portion 30A, a radial portion 30B, and a portion 30C inside the device 10, bordering the housing 50 on the bottom side Ci. The portions 30A and 30B form an L overall, in the hollow of which a concave surface 31 for the bearing of the spring 3 is formed. Advantageously, the spring 3 bears directly against the cup 30 with no intermediate part interposed between them, on this surface 31. The concavity of the surface 31 is oriented in the outer-bottom direction De+Di. On either side of the concavity, the surface 31 is extended by a flat portion 31a on the outer side Ce of the axial portion 30A and by a flat portion 31b on the bottom side Ci of the radial portion 30B. The portion 30C extends in the top direction Ds from the top side Cs of the radial portion 30B and comprises a face 32 inside the housing 50. The inner face 32 comprises a concave surface 33 receiving the surface 26 of the bottom race 21 of the rolling bearing 20 resting obliquely in an inner-bottom direction Dc+Di. The inner face 32 also comprises a hollow housing 34-35 including an axial surface 34 and a radial surface 35 for receiving the seal 60.

The top cup 40 comprises a median portion 40A, an outer portion 40B and an inner portion 40C. The median portion 40A, thicker and therefore stronger than the portions 40B and 40C, receives the outer race 22 of the rolling bearing 20 resting obliquely in an outer-upper direction De+Ds. The outer portion 40B extends from the median portion 40A in the bottom direction Di. The inner portion 40C extends from the median portion 40A forming an L, first in the central radial direction Dc and then overall in the bottom axial direction Di. The cup 40 comprises a face 42 inside the housing 50, which extends over the portions 40A, 40B and 40C, as explained in detail below. The inner face 42 borders the housing 50 on the inner side Cc, top side Cs and outer side Ce at the same time.

In practice, the bottom cup 30 transmits to the rolling bearing 20 essentially axial forces exerted on the device 10 by the suspension spring 3. More precisely, these forces are directly essentially in the top direction Ds and are transmitted by the spring 3 to the cup 30, then to the rolling bearing 20, then to the cup 40. In the context of the invention, the cups 30 and 40 are made of plastic, for example of PA66 or PA6. This plastic is sufficiently strong in service and improves the adhesion between the seal 60 and the cups 30 and 40, in comparison with cups made of metal.

The sealing of the housing 50, delimited between the cups 30 and 40, is considerable so as not to disrupt the operation of the rolling bearing 20 and of the stop 10. The housing 50 comprises an outer opening 51 delimited between an edge 37 belonging to the radial portion 30B of the bottom cup 30 and an edge 47 belonging to the outer portion 40B of the top cup 40. Similarly, the housing 50 comprises an inner opening 52 delimited between an edge 38 belonging to the bottom cup 30, situated in the corner of the L formed by the portions 30A and 30B, and an edge 48 belonging to the inner portion 40C of the top cup 40. From the opening 52, the portions 30B and 30C of the bottom cup 30 and the portion 40C of the top cup 40 form a labyrinth 53 inside the housing 50. At the opening 51, the seal 60 is overmoulded onto the bottom cup 30 and comprises two sealing lips 70 and 80 received in a sealed contact on the top cup 40, as explained in detail below. The lips 70 and 80 are shown, on the one hand, in service in FIGS. 1 and 2, being deformed in contact with the cup 30 and, on the other hand, at rest in FIG. 3, that is to say without deformation.

In practice, the labyrinth 53 and the seal 60 are designed to prevent the ingress of water or of other polluting particles into the housing 50, respectively from the inner side Cc and from the outer side Ce of the device 10. The corner 37 is further from the axis X1 on the outer side Ce than the corner 47, while the corner 38 is closer to the axis X1 on the inner side Cc than the corner 48. Thus, the openings 51 and 52 are even better protected from the ingress likely to originate from the bottom side Ci and from the wheel, as is generally the case.

As shown in FIG. 2, the inner face 42 of the top cup 40 comprises a concave surface 43 receiving the surface 28 of the outer race 22 of the rolling bearing 20. The face 42 also comprises a radial annular surface 44 oriented on the inner side Ci, designed to receive the lip 80 of the seal 60 in sealed contact. The face 42 also comprises an axial cylindrical surface 46 oriented on the inner side Cc, bordering the opening 51 and designed to receive the lip 70 of the seal 60 in sealed contact. The face 42 also comprises a shoulder 45, made to be set back from the top side Cs of the surface 46 relative to the outer opening 51, of which the safety function is explained in detail below. The face 42 is situated opposite the face 32, sufficiently close together so that the seal 60 extends across the housing 50.

The outer seal 60 is placed on the outer side Ce of the device 10 and is designed to achieve the sealing at the outer opening 51 of the device 10. The seal 60 is made of thermoplastic, for example of TPE polyethylene or of TPU polyurethane. The seal 60 is overmoulded onto a support made of plastic, namely the bottom cup 30. The seal 60 comprises a base 61 of substantially annular shape surrounding the axis X10, from which the two sealing lips 70 and 80 extend. The annular shape of the base 61 is simple in comparison with certain existing devices, comprising L-shaped or U-shaped bases, which simplifies the manufacture of the seal 60 and its incorporation into the device 10. The base 61 comprises a cylindrical inner surface 62 and a radial annular surface 63, these surfaces being adapted to be received respectively on the inner side Cc against the surface 34 and on the bottom side Ci against the surface 35 of the inner face 32 of the cup 30, during the overmoulding of the seal 60 onto this cup 30. The mechanical adhesion between the plastics of the cup 30 and of the seal 60 is improved, in comparison with the devices in which the seal is mounted on a metal support. The two sealing lips 70 and 80 extend from a corner 64 of the base 61, opposite to the surfaces 61 and 62. Hereinafter, a half-plane P1 comprising the main axis X1 is considered to be radial to this axis X1.

As shown in FIG. 3, the sealing lip 70 comprises a first lip portion 71 and a second lip portion 72 connected by a preformed elbow 73. In the half-plane P1, the first portion 71 extends along a first median line A71, from the corner 64 of the base 61 to the elbow 73, while the second portion 72 extends along a second median line A72 from the elbow 73 to a bearing end 74 of the lip 70 on the top cup 40. More precisely, the end 74 is placed in sealed contact on the axial cylindrical face 46 of the cup 40. The elbow 73 is situated set back towards the rolling bearing 20, inside the housing 50, relative to the end 74. In the half-plane P1 also, the lip 70 defines an obtuse angle α70 and an acute angle β70 between the median lines A71 and A72.

Similarly, the sealing lip 80 comprises a first lip portion 81 and a second lip portion 82, these portions being connected by a preformed elbow 83. In the half-plane P1, the first portion 81 extends along a first median line A81, from the corner 64 of the base 61 to the elbow 83, while the second portion 82 extends along a second median line A82, from the elbow 83 to a bearing end 84 of the lip 80 on the top cup 40. More precisely, the end 84 is placed in sealed contact on the radial annular face 44 of the cup 40. The elbow 83 is situated set back towards the rolling bearing 20, inside the housing 50, relative to the end 84. In the half-plane P1 also, the lip 80 defines an obtuse angle α80 and an acute angle β80 between the median lines A81 and A82.

In practice, the two sealing lips 70 and 80 of the seal 60 comprise, on the one hand, the radial lip 70 of which the acute angle β70 is oriented overall in the outer radial direction De relative to the axis X1 and, on the other hand, the axial lip 80 of which the acute angle β80 is oriented overall in the top axial direction Ds relative to the axis X1, both at rest and in service. In other words, the angle β70 has a bisecting line that is always inclined at an angle greater than 45° relative to the axis X1, while the angle β80 has a bisecting line that is always inclined at an angle of less than 45° relative to the axis X1. Depending on the operating conditions of the device 10 and on the geometric design parameters of the lips 70 and 80, each acute angle β70 and β80 is between 10° inclusive and 90° exclusive, preferably equal to 60° approximately when the seal 60 is at rest.

In the half-plane P1, each sealing lip 70 and 80 defines a thickness respectively e70 or e80, a length at rest, respectively L70 or L80, and a ratio of the thickness by the length at rest, respectively e70/L70 or e80/L80. The thickness e70, measured perpendicularly to the median line A71 at the portion 71 and perpendicularly to the median line A72 at the portion 72, is a constant from the base 61 of the seal 60 to the bearing end 74 of the lip 70. Similarly, the thickness e80, measured perpendicularly to the median line A81 at the portion 81 and perpendicularly to the median line A82 at the portion 82, is constant from the base 61 of the seal 60 to the bearing end 84 of the lip 80. Only the elbows 73 and 83 form a slight discontinuity such that each of the thicknesses e70 and 80 may be qualified as "substantially constant" along the lip 70 or 80. As an example, each thickness e70 or e80 is between 0.4 and 0.8 millimeter, preferably between 0.5 and 0.7 millimeter, yet more preferably equal to 0.6 millimeter.

In practice, the lips 70 and 80 can be deformed against the cup 40 when the device 10 is in service, such that the length of the lips 70 and 80 is variable. As shown in FIG. 3, each of the lengths at rest L70 or L80 is measured perpendicularly to the base 61 of the seal 60, between this base 61 and respectively, on the one hand, the bearing end 74 of the lip 70 in the radial direction Ds for the length L70 and, on the other hand, the bearing end 84 of the lip 80 in the axial direction De for the length L80, when the seal 60 is at rest. As an example, each length at rest L70 or L80 is between 2 and 4 millimeters, preferably between 2.5 and 3.5 millimeters, yet more preferably equal to 3 millimeters. Thus, the lips 70 and 80 are defined such that each of the ratios e70/L70 or e80/L80 is strictly less than 0.206, preferably less than 0.2.

In the example of FIGS. 1 to 3, the portion 71 is shorter than the portion 72 along their median lines A71 and A72 and, similarly, the portion 81 is shorter than the portion 82 along their median lines A81 and A82. In other words, the elbow 73 is closer to the base 61 than the bearing end 74 of the lip 70 and, similarly, the elbow 83 is closer to the base 61 than the bearing end 84 of the lip 80. Equally in the example of FIGS. 1 to 3, each of the ends 74 and 84 has a rounded shape in the half-plane P1. As an alternative, the end 74 or 84 may have a pointed triangular shape or, preferably, a square shape including two potential points of contact with the cup 40.

At this stage, it is noted that the end 74 of the lip 70 is bearing against the cup 40 between, on the one hand, the safety shoulder 45 formed on the cup 40 and, on the other hand, the opening 51 delimited between the cups 30 and 40. The end 74 of the lip 70 is pressed against this shoulder 45 when ingress of water or of polluting particles exert an external pressure against the lip 70 when entering through the opening 51, or else in the case of axial movement of the bottom cup 30 relative to the top cup 40 in the direction Ds, when the device 10 is in service and subjected to the axial forces of the spring 3, which makes it possible to compensate for the inner clearances of the device 10. Thus, by virtue of the shoulder 45, the sealed contact between the lip 70 and the cup 40 is maintained irrespective of the operating conditions of the device 10. The shoulder 45 prevents the lip 70 from folding up towards the inside of the housing 50 when these conditions are particularly severe.

In the context of the present invention, the effectiveness of the sealed sealing of the device 10 is enhanced by the specific shape of the seal 60, in particular the shape of the lips 70 and 80, and by the presence of the shoulder 45 on the cup 40, without increasing the friction torque between the seal 60 and the cup 40 and without reducing the other performances of the device 10. The lip 70 constitutes the main sealed barrier of the device 10, while the lip 80 constitutes the sealed safety barrier of the device 10, in the event of ingress occurring despite everything between the end 74 of the lip 70 and the cup 40.

Figures 4, 5:
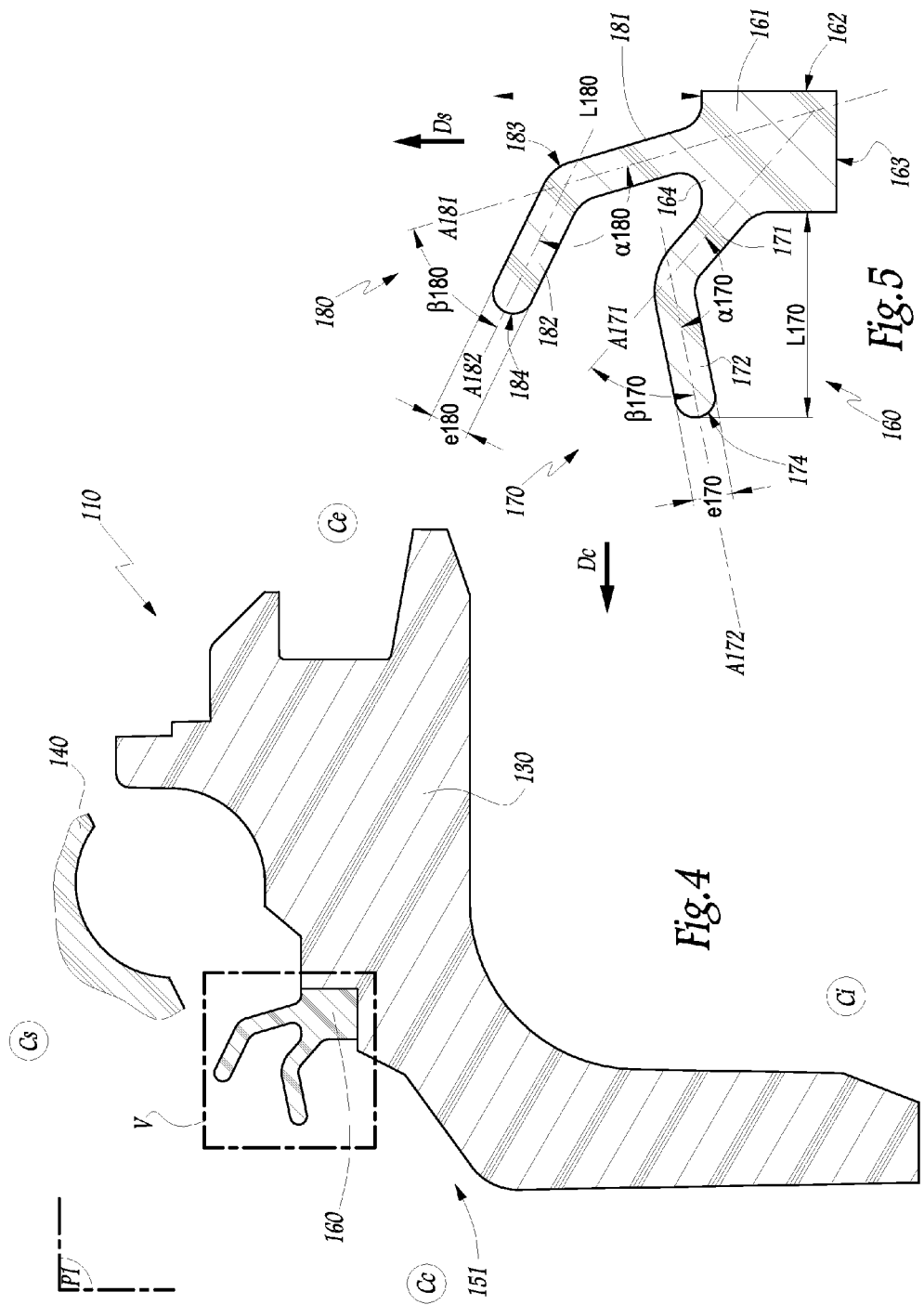
FIG. 4 is a view similar to FIG. 2, of a suspension bearing device according to a second embodiment of the invention, only the bottom cup and the seal being shown.
FIG. 5 is a view similar to FIG. 3, showing only the seal of FIG. 4.

FIGS. 4 and 5 show a second embodiment of a suspension bearing device 110 according to the invention, suitable for being fitted to the strut 1 of FIG. 1.

The device 110 comprises a bearing not shown, a bottom cup 130, a top cup 140 partially shown in FIG. 4, and an inner seal 160. The seal 160, placed on the inner side Cc of the device 110, is designed to achieve the sealing at an inner opening 151 of the device 110.

Apart from this difference, the geometric parameters of the seal 60 and of the lips 70 and 80, described hereinabove with reference to the first embodiment, are valid for the seal 160 of the second embodiment, comprising a radial lip 170 oriented on the inner side Cc and an axial lip 180 oriented on the top side Cs. The elements forming the seal 160 are comparable with the elements forming the seal 60 described above and bear the same reference numbers increased by 100. This involves the annular base 161, the surfaces 162 and 163, the corner 164, the portions 171, 172, 181 and 182, the median lines A171, A172, A181 and A182, the elbows 173 and 183, the bearing ends 174 and 184, the angles α170, α180, β170 and β180, the thicknesses e170 and e180, the lengths at rest L170 and L180, and the ratios e170/L170 and e180/L180.

One difference between the lip 80 and the lip 180 is that, for this lip 180, the first portion 181 has the same length as the second portion 182 along their respective median lines A181 and A182. In other words, the elbow 183 is equidistant from the base 161 of the seal 160 and from the bearing end 184 of the lip 180. This is simply due to the particular configuration of the cups 130 and 140 in this embodiment.

The cup 140 also comprises an inner shoulder, not shown for the purposes of simplification, on which the lip 170 can rest. This shoulder, except for its position on the inner side Cc, is comparable to the shoulder 45 of the cup 40.

Furthermore, the strut 1 may be formed differently from FIG. 1 without departing from the context of the invention. In addition, at least certain elements forming the device 10 or 110 may be formed differently from FIGS. 1 to 5 without departing from the context of the invention.

As a variant not shown, the suspension bearing device 10 or 110 can be fitted to a suspension system other than that of a motor vehicle.

According to another variant not shown, it is possible for the rolling bearing 20 not to be angle contact, but straight contact.

According to another variant not shown, at least one raceway for the rolling bearing 20 may be formed directly on the cup 30 and/or on the cup 40.

According to another variant not shown, the seal 60 or 160 may comprise a single radial lip 70 or 170 or a single axial lip 80 or 180 extending from its base 61 or 161. In this case, the device 10 or 110 preferably comprises a safety shoulder similar to the shoulder 45.

According to another variant not shown, the device 10 or 110 may comprise both an outer seal 60 and an inner seal 160 arranged between the cups. This variant is more costly but further reduces the risks of ingress of water or of polluting particles into the inner housing 50 of the device 10.

According to another variant not shown, the device 10 or 110 may comprise an outer seal and/or an inner seal overmoulded onto the top cup 40 or 140, of which the lip or lips are in sealed contact with the bottom cup 30 or 130.

According to another variant not shown, certain lips 70, 80, 170 or 180 may be split at their bearing end 74, 84, 174 or 184. In this case, the lip has two points of contact with the corresponding cup.

Irrespective of the embodiment, the device 10 or 110 comprises a bottom cup 30 or 130 and a top cup 40 or 140 made of plastic, and at least one seal 60 or 160 made of thermoplastic overmoulded onto a first element 30, 40, 130 or 140 made of plastic amongst the bottom cup and the top cup, the seal 60 or 160 comprising a base 61 or 161 of substantially annular shape from which extends at least one sealing lip 70, 80, 170 and/or 180 in contact with the second element 30, 40, 130 or 140 made of plastic, distinct from the first element, amongst the bottom cup and top cup.

Preferably, each seal 60 or 160 comprises two sealing lips 70 and 80, or 170 and 180, in contact with the second element, in this instance the top cup 40 or 140 in the examples of FIGS. 1 to 5. Preferably, each seal 60 or 160 has at least two points of contact with the second element, formed either by the two bearing ends of the two lips belonging to this seal, or by a single lip split at its bearing end, or by the split bearing ends of two lips. Thus, the risks of ingress of water or of polluting particles into the inner housing 50 of the device 10 are further reduced.

Moreover, all or certain of the technical features of the various embodiments may be combined. Thus, the suspension bearing device and the strut may be adapted in terms of cost, performance and simplicity of implementation.

The invention claimed is:

1. A suspension bearing device comprising:
   at least one rolling bearing forming an axial stop along a main axis;
   at least one seal adapted for protecting the rolling bearing from ingress of water or of polluting particles; and
   a bottom cup and a top cup made of plastic, in contact with each rolling bearing, the bottom cup forming a bearing means for a suspension spring,
   wherein the at least one seal is made of thermoplastic overmolded onto a first element made of plastic between the bottom cup and the top cup and includes a base of substantially annular shape from which extends at least one sealing lip in contact with the second element made of plastic between the bottom cup and the top cup, and
   wherein the second element includes an internal face having a shoulder configured to limit movement of at least one sealing lip,
   wherein a radial surface of the base of the at least one seal is received on top of a radial surface of the first element.

2. The suspension bearing device according to claim 1, wherein each rolling bearing provides an inner race in contact with the bottom cup, an outer race in contact with the top cup and rolling elements placed between the inner race and the outer race.

3. The suspension bearing device according to claim 1, further comprising a single angular-contact rolling bearing.

4. The suspension bearing device according to claim 1, wherein the at least one seal further comprises two sealing lips in contact with the second element, each sealing lip having at least one point of contact with the second element.

5. The suspension bearing device according to claim 1, wherein each sealing lip further comprises a preformed elbow between:
   a first lip portion extending to the base of the seal, and
   a second lip portion extending to a bearing end of the sealing lip on the second element.

6. The suspension bearing device according to claim 5, wherein for each sealing lip, in section in a half-plane comprising the main axis:
   the first lip portion extends along a first median line,
   the second lip portion extends along a second median line, and
   the sealing lip defines an acute angle, between the first median line and the second median line.

7. The suspension bearing device according to claim 4, wherein the two sealing lips of the seal further comprises:
   a radial lip of which an acute angle between a first median line and a second median line is oriented overall in a direction radial to the main axis, and
   an axial lip of which an acute angle between a first median line and a second median line is oriented overall in a direction axial to the main axis.

8. The suspension bearing device according to claim 6, wherein each acute angle is between 10° included and 90° excluded.

9. The suspension bearing device according to claim 6, wherein each sealing lip defines in section in a half-plane in reference to the main axis:
   a thickness, measured perpendicularly to a median line of the sealing lip which is substantially constant from the base of the seal to the bearing end of the sealing lip;
   a length at rest, measured perpendicularly to the base of the seal between this base and the bearing end of the sealing lip when the seal is at rest; and
   a ratio of the thickness by the length at rest which is less than 0.206.

10. The suspension bearing device according to claim 9, wherein the thickness of each sealing lip is constant and between 0.4 and 0.8 millimeter.

11. The suspension bearing device according to claim 9, wherein the length at rest of each sealing lip is between 2 and 4 millimeters.

12. The suspension bearing device according to claim 6, wherein for one of the at least one sealing lips, the first lip portion is at least one of a shorter and the same length as the second lip portion along their respective median lines, the elbow being at least one of closer to and equidistant from the base of the seal than from the bearing end of the sealing lip.

13. A strut of a motor vehicle, comprising:
   a damper, and
   a suspension bearing device according to claim 1.

14. The suspension bearing device according to claim 6, wherein each sealing lip defines in section in a half-plane in reference to the main axis:
   a thickness, measured perpendicularly to a median line of the sealing lip which is substantially constant from the base of the seal to the bearing end of the sealing lip;
   a length at rest, measured perpendicularly to the base of the seal between this base and the bearing end of the sealing lip when the seal is at rest; and a ratio of the thickness by the length at rest which is less than 0.2.

15. The suspension bearing device according to claim 9, wherein the thickness of each sealing lip is constant and between 0.5 mm and 0.7 mm.

16. The suspension bearing device according to claim 9, wherein the thickness of each sealing lip is equal to 0.6 mm.

17. The suspension bearing device according to claim 9, wherein the length at rest of each sealing lip is between 2.5 mm and 3.5 mm.

18. The suspension bearing device according to claim 9, wherein the length at rest of each sealing lip is equal to 3 mm.

19. The suspension bearing device according to claim 1, wherein the at least one sealing lip extends from a first corner of the base, and the radial surface of the base and a cylindrical inner surface form a second corner of the base opposite to the first corner of the base.

20. A suspension bearing device comprising:
at least one rolling bearing forming an axial stop along a main axis;
at least one seal adapted for protecting the rolling bearing from ingress of water or of polluting particles; and
a bottom cup and the top cup made of plastic, in contact with each rolling bearing, the bottom cup forming a bearing means for a suspension spring,
wherein the at least one seal is made of thermoplastic overmolded onto a first element made of plastic between the bottom cup and the top cup and includes a base of substantially annular shape from which extends at least one sealing lip in contact with a second element made of plastic between the bottom cup and the top cup,
wherein the second element has an internal face furnished with a shoulder, and the at least one sealing lip has at least one bearing end with the second element disposed between the shoulder and an opening delimited between the bottom cup and the top cup,
wherein a radial surface of the base of the at least one seal is received on top of a radial surface of the first element.

* * * * *